(No Model.)

H. C. WIRT.
TESTING CIRCUIT FOR ALTERNATING CURRENT SYSTEMS OF DISTRIBUTION.

No. 543,364. Patented July 23, 1895.

Witnesses:
A. F. Macdonald.
B. B. Hull.

Inventor:
Herbert C. Wirt,
by Geo. R. Blodgett,
Atty.

UNITED STATES PATENT OFFICE.

HERBERT C. WIRT, OF SCHENECTADY, NEW YORK, ASSIGNOR TO THE GENERAL ELECTRIC COMPANY, OF NEW YORK.

TESTING-CIRCUIT FOR ALTERNATING-CURRENT SYSTEMS OF DISTRIBUTION.

SPECIFICATION forming part of Letters Patent No. 543,364, dated July 23, 1895.

Application filed April 23, 1895. Serial No. 546,828. (No model.)

*To all whom it may concern:*

Be it known that I, HERBERT C. WIRT, a citizen of the United States, residing at Schenectady, in the county of Schenectady, State of New York, have invented certain new and useful Improvements in Testing-Circuits for Alternating-Current Systems of Distribution, of which the following is a specification.

My invention relates to alternating-current installations, and has for its object to provide a convenient and rapid system of testing the transformers in such installations, preferably conducting the tests at the power-house or central station, and thus avoiding the necessity of carrying portable testing apparatus from one transformer to another.

For the purposes pointed out, I connect the secondary of each transformer to the central station by a lead, which may be of small wire and high resistance. This connection may be made to any convenient point of the mains supplied by the secondary of each transformer, and may, if preferred, include two or three different transformers in a single circuit; but in this case the test will only indicate that one or the other of the various transformers is defective. In the central station I place a galvanometer and a battery (or other convenient source of electromotive force) in each lead, and with a suitable switch connect either of the mains leading to the transformer-primaries with the galvanometer. I may, if preferred, connect all of the leads by suitable switches to a single battery and galvanometer, and ordinarily this would be the most economical arrangement.

The accompanying drawings show diagrammatic embodiments of my invention, wherein—

Figure 1:
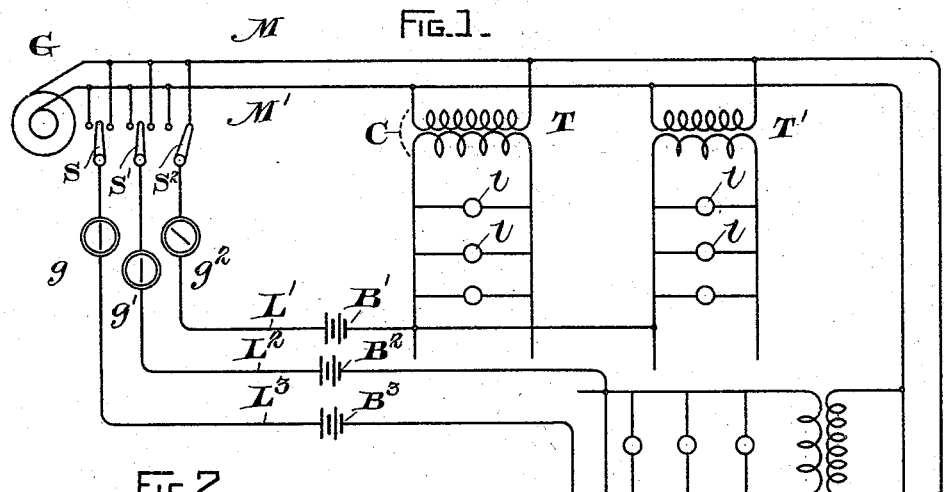
Figure 2:
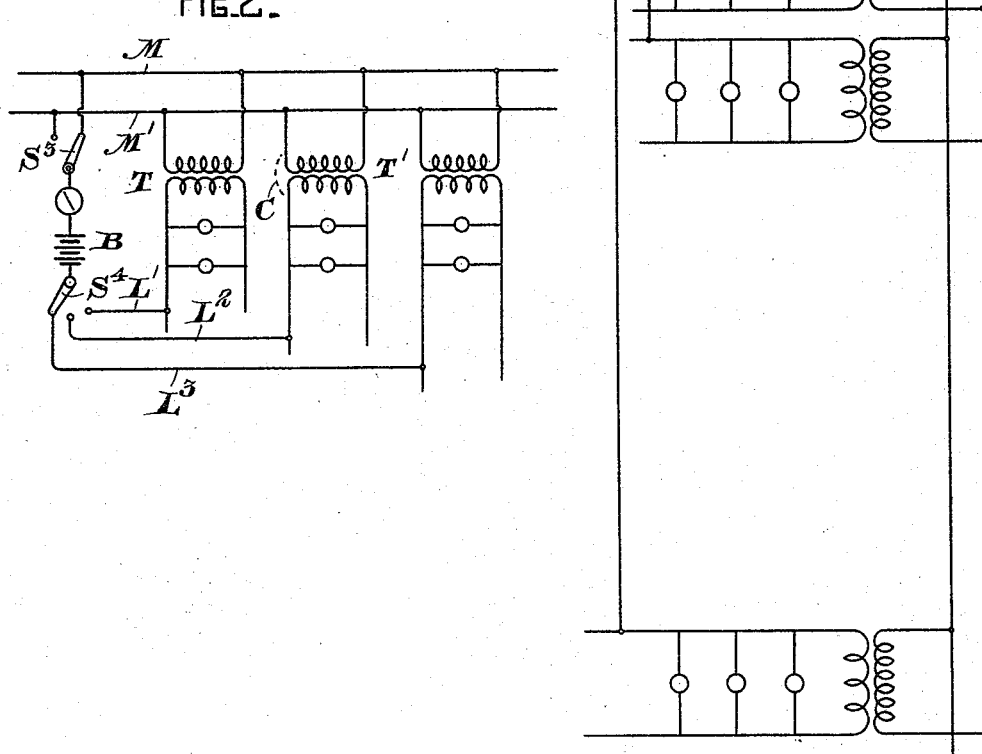

Figure 1 shows separate leads and separate batteries and galvanometers, while Fig. 2 shows an arrangement in which one galvanometer and battery are employed.

G is a generator of alternating current supplying the mains M M' leading to the primaries of the transformers T T', &c. Each transformer-secondary supplies groups of lamps $ll$. From each group of lamps, the connection being taken to any convenient point in the mains, leads L' L² L³ run to the central station. In each lead, Fig. 1, is included a battery B', &c., and galvanometer $g$, $g'$, or $g^2$. Across the transformer T the dotted line C indicates a metallic or leakage connection from primary to secondary. It is the purpose of the invention to test for just such accidental metallic connections, which may occur through defects in the insulation, making a circuit through the iron core from one side of the transformer to the other. The circuit of the apparatus would then be: from the battery B' to the galvanometer $g^2$, (which is shown deflected,) by the switch S² to the main M, to the primary of the transformer T, across the leak C to the secondary of the transformer T, and back to the battery B'. It is evident that with the arrangement shown in Fig. 1 a similar leak in the next transformer on the same circuit would also show upon the galvanometer $g^2$ and separate tests would be necessary; but in the case of the transformer in the lower part of Fig. 1, to which the circuit is made by the lead B³, as this is the only one on the lead, the defect need only be looked for in this particular one. If, however, there be no leakage across from one coil to the other in the transformer, the circuit would be open at that point and there would be no indication in the galvanometer.

Fig. 2 illustrates a modified form of the invention, in which the parts are as before except that for the batteries B', &c., in each lead a single battery is used having connected to one of its terminals a switch S⁴, by which either one of the leads L' to L³ may be connected at will. In this arrangement a single galvanometer is used, and one of its terminals is connected to a second switch S³, by which either one of the mains M M' may be connected in the circuit. The operation of this device is the same as of that shown in Fig. 1.

What I claim as new, and desire to secure by Letters Patent of the United States, is—

1. The means for testing transformer leakage in an alternating current system of distribution herein set out, comprising mains, transformers having their primaries in multiple arc across the mains, leads from the secondaries of such transformers including a galvanometer or current-indicating device and a source of electro-motive force, and means for connecting the leads to one or the other of the mains.

2. The means for testing for transformer leakage in an alternating current system of distribution herein set out, comprising mains between which the primaries of the transformers are connected in multiple arc, leads including a plurality of the transformer secondaries going back to the central station or other suitable point, current-indicating devices, and a source of electro-motive force distinct from the main generator of the system in such leads, in combination with means for connecting the leads to one or the other of the mains at will.

3. The means for testing for transformer leakage in an alternating current system herein set out, consisting of mains, transformers having their primaries in multiple arc across the mains, leads from the transformers to the central station or other suitable point, a galvanometer, a source of electro-motive force, and suitable switching appliances arranged to connect the galvanometer and a source of electro-motive force in circuit with either one of the leads from the transformers and with either one of the mains at will.

In witness whereof I have hereunto set my hand this 20th day of April, 1895.

HERBERT C. WIRT.

Witnesses:
B. B. HULL,
A. F. MACDONALD.